Feb. 9, 1943.　　　A. W. SEYFRIED　　　2,310,554
SUCTION NOZZLE
Filed Oct. 18, 1941　　　3 Sheets-Sheet 1
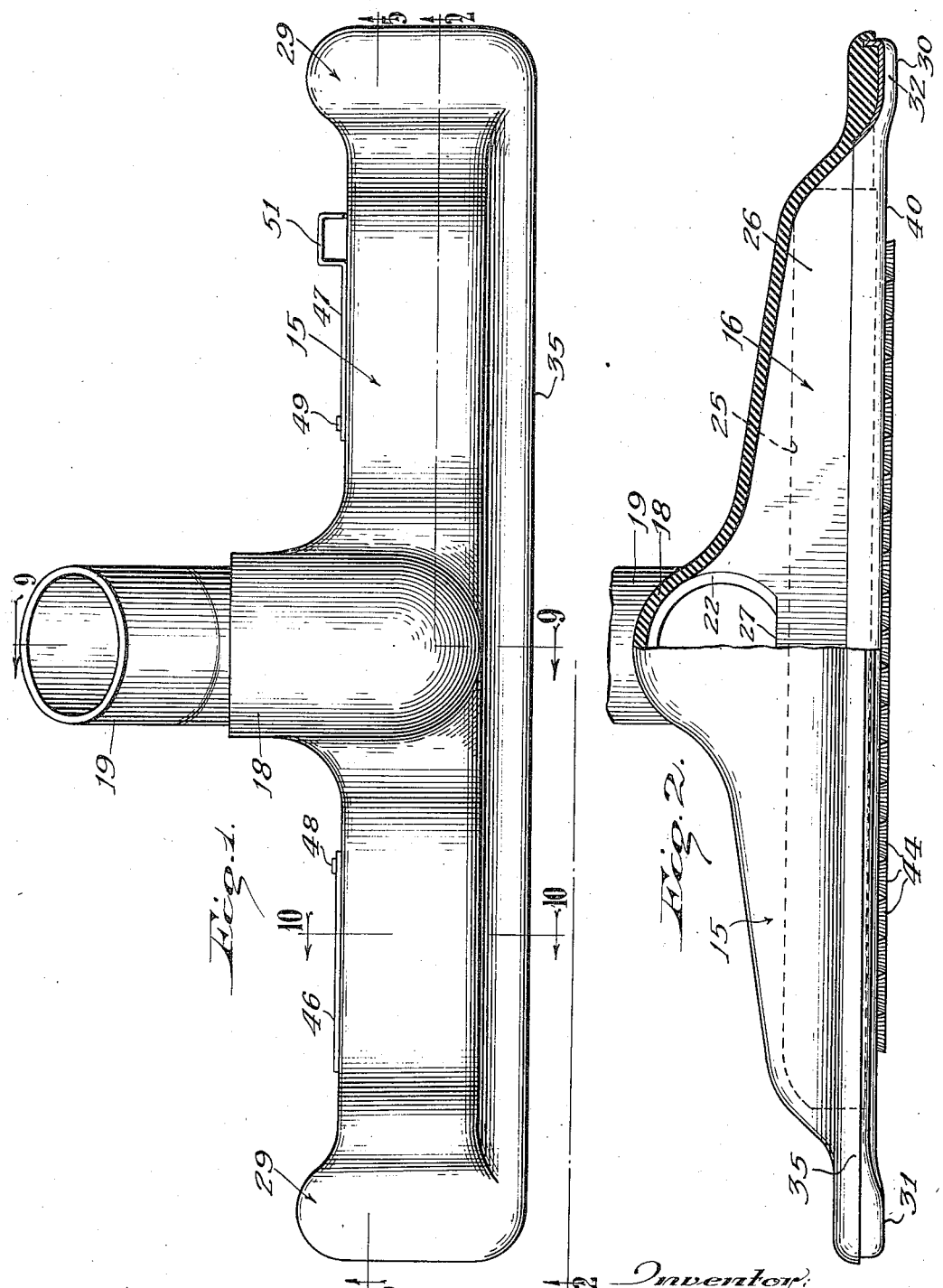

Feb. 9, 1943.   A. W. SEYFRIED   2,310,554
SUCTION NOZZLE
Filed Oct. 18, 1941   3 Sheets-Sheet 2
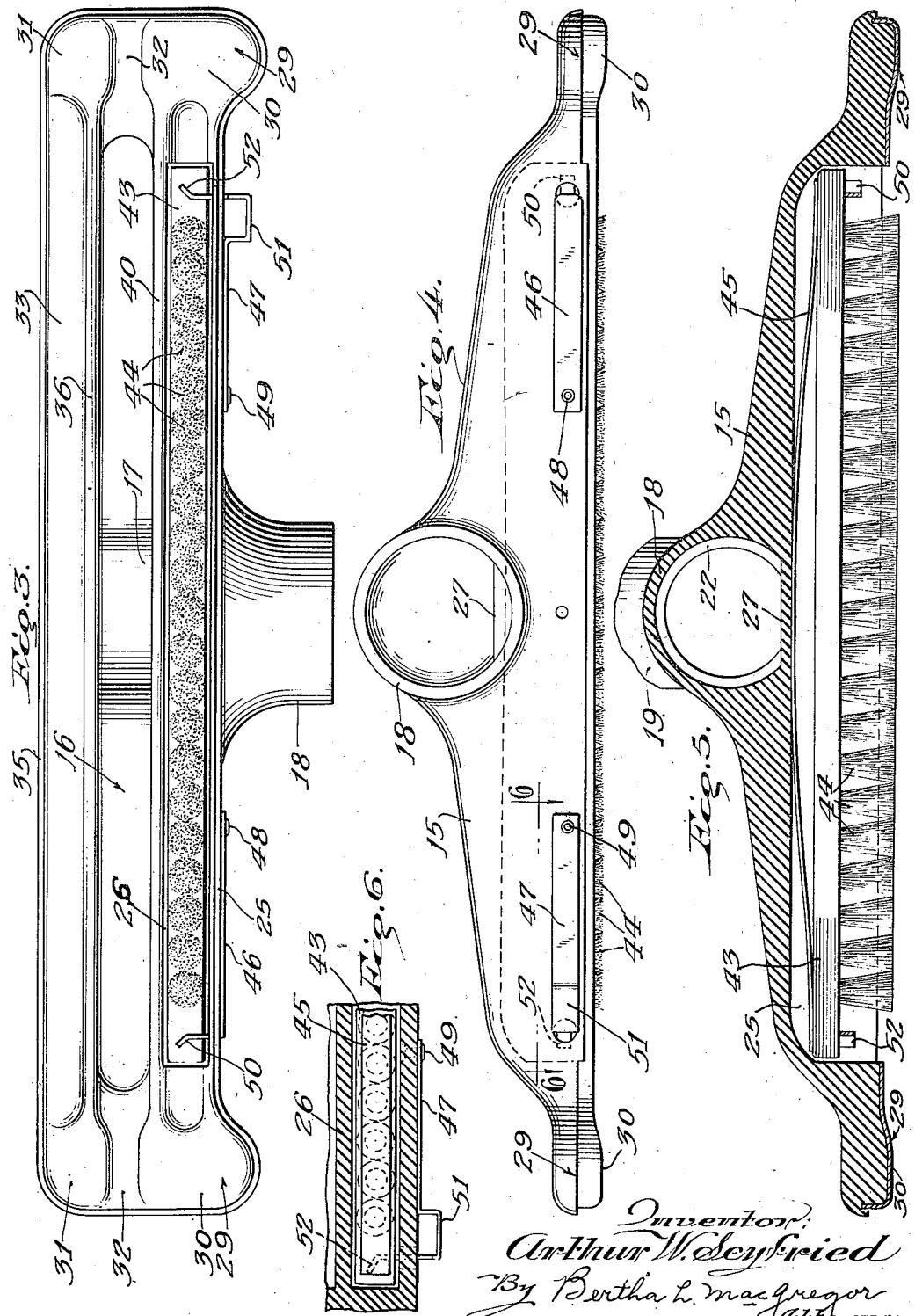

Feb. 9, 1943.　　A. W. SEYFRIED　　2,310,554
SUCTION NOZZLE
Filed Oct. 18, 1941　　3 Sheets-Sheet 3
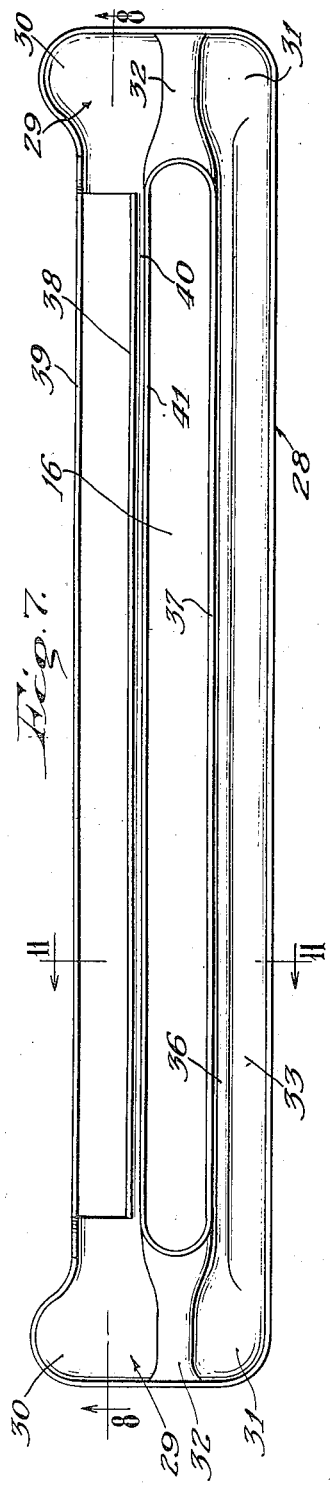
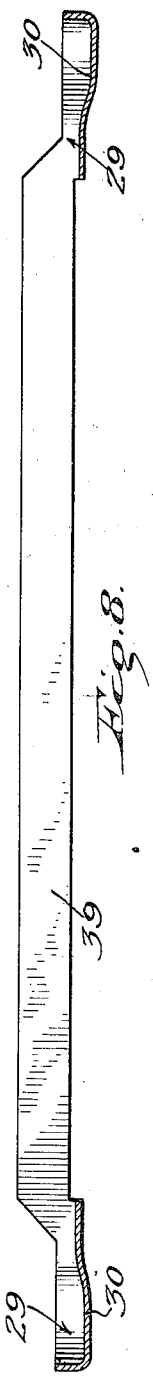
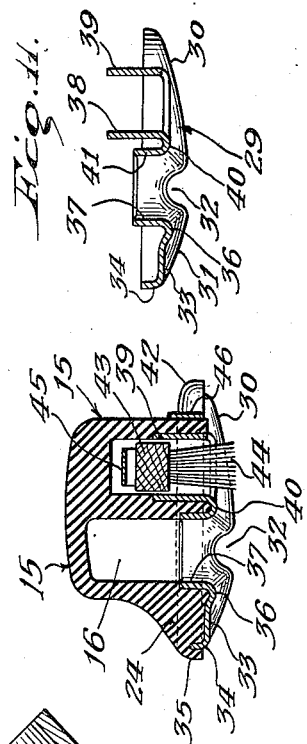
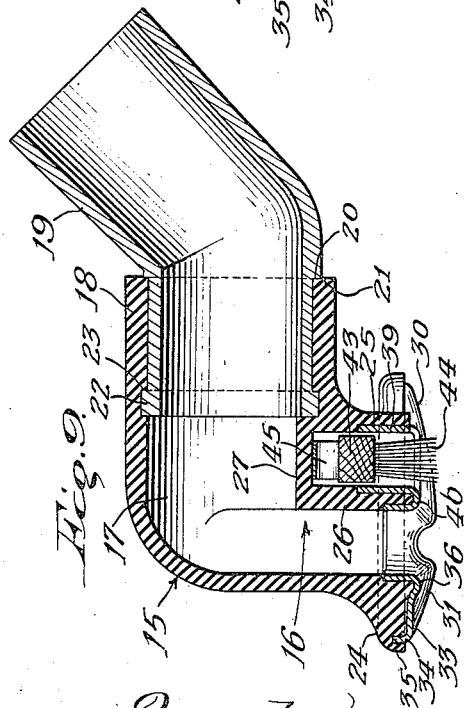
Inventor:
Arthur W. Seyfried
By Bertha L. MacGregor
Attorney Patented Feb. 9, 1943

2,310,554

UNITED STATES PATENT OFFICE 2,310,554

SUCTION NOZZLE

Arthur W. Seyfried, Racine, Wis., assignor to Scovill Manufacturing Company, Waterbury, Conn., a corporation of Connecticut Application October 18, 1941, Serial No. 415,549

6 Claims. (Cl. 15—158)

This invention relates to a suction nozzle especially adapted for use with vacuum cleaners. The main object of the invention is to produce a composite rubber and metal nozzle comprising a vulcanized rubber body portion and a metal floor plate connected together to form a unitary structure in which the floor plate supports and reinforces the rubber body portion and said body portion functions as a nozzle and also provides a resilient furniture guard overhanging the edges of the metal floor plate, and further serves as a resilient mounting for a swivel joint to which the suction hose is connected.

Another object is to provide a nozzle of the character described with a vertically floating and transversely rocking brush, and means for quickly and easily detachably mounting said brush in a brush housing formed integrally with said nozzle body.

Another object is to provide the nozzle floor plate with shoes or end members which permit rocking movement of the nozzle whereby it automatically accommodates itself to the surface to be cleaned and allows said floating brush to vary its operative position relatively to the nozzle while maintaining the ends of the bristles in surface engaging positions.

In the drawings:

Fig. 1 is a top plan view of the suction nozzle embodying my invention.

Fig. 2 is a front elevational view partly in section, taken in plane of the line 2—2 on Fig. 1.

Fig. 3 is a bottom view of the nozzle, with the swivel joint removed.

Fig. 4 is a rear elevational view of the nozzle shown in Fig. 3.

Fig. 5 is a longitudinal vertical sectional view taken in the plane of the line 5—5 on Fig. 1.

Fig. 6 is a fragmentary sectional view taken in the horizontal plane indicated by the line 6—6 on Fig. 4.

Fig. 7 is a bottom plan view of the metal floor plate portion of the nozzle, shown apart from the rest of the nozzle.

Fig. 8 is a longitudinal vertical sectional view taken in the plane of the line 8—8 on Fig. 7.

Fig. 9 is a transverse sectional view of the nozzle shown in Fig. 1, taken in the plane of the line 9—9 on Fig. 1.

Fig. 10 is a transverse sectional view taken in the plane of the line 10—10 on Fig. 1.

Fig. 11 is a transverse sectional view of the floor plate shown in Fig. 7, taken in the plane of the line 11—11 on Fig. 7.

In that embodiment of the invention shown in the drawings, the nozzle comprises a body portion 15 made of vulcanized rubber shaped to provide a suction slot 16 relatively narrow and extending throughout the major length of the nozzle in the forward portion of the nozzle. The suction slot 16 communicates with a suction conduit 17, the resilient neck 18 of which is adapted to receive the elbow shaped swivel joint 19. Said swivel joint 19 is provided with an offset portion which forms a shoulder 20 which abuts against the edge 21 of the neck 18 of the nozzle and prevents the swivel joint from being forced inwardly to too great an extent, as shown in Fig. 9. The annular rib 22 on the swivel joint 19 fits in the groove 23 formed in the nozzle neck 18 and retains the swivel joint in its intended position while permitting easy rotation of the joint relatively to the nozzle.

The body portion 15 of the nozzle comprises a front lip 24, thickened in its lower portion, a rear wall 25 and an intermediate rear lip 26, all preferably made of the vulcanized rubber of the nozzle body 15. The inner surfaces of the lip 24 and lip 26 define the width of the suction slot 16, and the lip 26 and rear wall 25 together with the horizontal wall 27 provide a brush housing extending parallel to the suction slot 16.

A metal floor plate 28 is secured to the rubber body 15 as hereinafter explained. Said plate 28 comprises end shoes 29, 29 which slope upwardly and rearwardly as indicated at 30 and are curved upwardly and forwardly as indicated at 31, respectively, at opposite sides of the grooves 32. The surfaces 30 and 31 of the end shoes 29 lie in lower planes than the longitudinally extending front lip plate 33 which underlies the thickened front lip 24 of the nozzle. Said lip plate 33 has an upturned front edge 34 imbedded in the rubber of the lip 24 slightly inwardly of the forward edge of said rubber lip 24 so that there is provided a resilient edge portion 35 which serves as a furniture guard. At the inner or rearward longitudinal edge of the said lip plate 33 is a curved rib 36 and an upturned wall 37, snugly engaging the lip portion 24 of the nozzle, said wall 37 being flush with the inner wall of the suction slot 16.

Integral with the rearward portions 30 of the shoes 29 are the vertical walls 38 and 39 which fit into recessed portions of the nozzle lip 26 and rear wall 25, respectively, of the nozzle and lie flush with the side walls of the brush housing formed by said parts 25, 26 and 27. Said wall 38 has a curved lower rib 40 and an upturned wall 41. Said curved ribs 40 and 36 form the longitudinal lower edges of the suction slot 16 and merge with the shoes 29 at opposite sides of the groove 32. The ribs 36 and 40 are raised relatively to the shoes 29 as shown in Figs. 9 and 11.

The metal floor plate 28, as a whole, underlies the rubber nozzle body 15, with the edges of the plate located slightly inwardly of the edges of the body whereby a furniture guard is integrally formed as heretofore described in connection with the parts 34 and 35 of the front lip, and as indicated by the overhanging rubber portion 42 along the rearward lip.

Within the brush housing formed by the walls 25, 27 and lip 26 is located an easily removable brush 43, the bristles 44 of which normally have their lower ends in a plane coincident with the lowermost portion of the end shoes 29 of the metal floor plate 28, as best shown in Figs. 5, 9 and 10. The top of the brush 43 is floatingly spaced from the wall 27 by a leaf spring 45 and said brush is prevented from falling out of its housing by spring metal retaining members 46 and 47 secured at 48 and 49, respectively, to the rear wall 25 of the nozzle. As shown, said retaining member 46 has an end 50 which projects through the walls 25 and 39 to engage one end of the brush and said retaining member 47 has a handle portion 51 which terminates in an end 52, the latter extending through said walls 25 and 39 into the brush housing for engaging the opposite end of the brush 43. When the handle 51 is pulled outwardly or rearwardly, the end 52 releases the brush 43 and permits it to be withdrawn from the retaining end 50 and thus be removed from the brush housing for the purpose of cleaning or replacing the brush. Said retaining members normally automatically return to the positions shown. Both retaining members 46 and 47 may be provided with the handle 51 so that they are identical. The leaf spring 45 permits the brush to adjust itself vertically in the housing to accommodate it to carpets of different nap and the brush has some lateral play in the housing so that there automatically is imparted to the brush a slight rocking movement as the nozzle is moved back and forth over the surface to be cleaned. This action renders the brush self-cleaning.

Making of the nozzle body 15 of resilient material such as vulcanized rubber has several advantages over an all metal construction, one advantage being the provision of a resilient swivel joint, and another being the provision of a furniture guard, extending around the metal floor plate 28, integral with the body portion 15. The saving of metal by the substitution of rubber is an important consideration. By using a metal floor plate 28 of the character described in combination with the rubber body 15, all the advantages of an all metal nozzle are retained and the additional advantages herein mentioned are obtained.

The zinc in the rubber of the body 15 and in the brass of the metal floor plate 28 produces a firm bond between said parts when the rubber body is vulcanized while the parts are in the assembled position shown in the drawings.

Changes may be made in details of construction without departing from the scope of my invention.

I claim:

1. A suction nozzle comprising a body of elastic material provided at its underside with a pair of closely adjacent suction and brush-containing surface cleaning slots extending thereinto, a friction floor plate of non-elastic reinforcing material for said nozzle having a pair of slots corresponding to and registering with those of the body, a pair of closely adjacent walls extending inwardly from said plate between the slots in the body and plate and embracing the elastic material of the body extending between the slots of the body, and a further wall extending inwardly from said plate parallel to the most adjacent of said pair of walls and cooperating therewith to provide brush guiding surfaces on opposite sides of the brush-containing slot in the body.

2. The structure recited in claim 1, wherein the walls surround each slot in the floor plate and extend into the body around each of the slots thereof.

3. The structure recited in claim 1 wherein a brush is slidably supported within one of the slots of the body, and resilient retaining and spacing means engaging upper and lower sides of said brush within the slot of the body to yieldably support the brush within the corresponding slot of the floor plate.

4. The structure recited in claim 1 wherein the pair of cleaning slots are disposed one in the forward and one in the rear portions of the floor plate, and the sides of said slots are inturned for cooperative relation with the corresponding slots of the body to provide closely adjacent suction and brush slots in the nozzle.

5. The structure recited in claim 1 wherein the floor plate is transversely embossed adjacent opposite ends of each of the slots therein to provide friction shoes extending to a lower plan than the intermediate slotted portions of the plate.

6. The structure recited in claim 1 wherein the floor plate is transversely embossed from opposite sides of the suction slot adjacent the ends thereof to provide friction shoes extending to a lower plane than the intermediate slotted portions of the plate and providing suction relieving grooves as extensions of the suction slot.

ARTHUR W. SEYFRIED.